United States Patent
Fite, Jr. et al.

(10) Patent No.: US 6,252,888 B1
(45) Date of Patent: *Jun. 26, 2001

(54) METHOD AND APPARATUS PROVIDING NETWORK COMMUNICATIONS BETWEEN DEVICES USING FRAMES WITH MULTIPLE FORMATS

(75) Inventors: David B. Fite, Jr., Northbough; Nicholas Ilyadis, Pepperell; Ronald M. Salett, Framingham, all of MA (US)

(73) Assignee: Nortel Networks Corporation, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,166

(22) Filed: Apr. 14, 1998

(51) Int. Cl.$^7$ ............................................... H04J 3/16
(52) U.S. Cl. ..................... 370/466; 370/242; 370/401; 370/470
(58) Field of Search .................... 270/401, 402, 270/403, 404, 437, 445, 465, 466, 467, 470, 242, 243, 244, 245, 246, 474, 476

(56) References Cited

U.S. PATENT DOCUMENTS

| | | | |
|---|---|---|---|
| 5,872,781 | 2/1999 | Bennett et al. | 370/365 |
| 5,935,268 | * 8/1999 | Weaver | 714/758 |
| 5,987,034 | * 11/1999 | Simon et al. | 370/465 |
| 6,038,227 | * 3/2000 | Farris et al. | 370/404 |
| 6,049,528 | * 4/2000 | Hendel et al. | 370/437 |
| 6,094,439 | * 7/2000 | Krishna et al. | 370/445 |

OTHER PUBLICATIONS

"Release Notes for the BayStack Model 350T 10/100 Autosense Switch" Part No. 896–00162–A, Bay Networks, Mar. 1997.
"Switch Node Product Description" Part. No. 11347 Rev. A, Bay Networks, May 1997.
"Ethernet Tutorial" at http://www.six.es/tutorial.htm, Manual Ethernet Page, Mar. 8, 1998.

(List continued on next page.)

*Primary Examiner*—Douglas Olms
*Assistant Examiner*—Shick Hom
(74) *Attorney, Agent, or Firm*—Blakely Sokoloff; Taylor & Zafman LLP

(57) ABSTRACT

A method and an apparatus providing data communications among network devices using tagged and untagged frame formats. In one embodiment, a virtual local area network (VLAN) is implemented using frames that may be transferred among network devices in both tagged and untagged formats. In one embodiment, the frames are transferred among network switches in an untagged format, independent of whether the source devices sent the frames in a tagged or untagged format. In addition, destination devices may receive frames in either a tagged or an untagged format, independent of whether the source devices originally send the frames a tagged or untagged format. Cyclic redundancy check (CRC) code information contained in the frames as originally sent is left unchanged when transferred among the switches of the VLAN, even though the frames may have been modified prior to transfer among switches. New CRC code information is generated for reformatted frames in the switches containing the outbound ports such that reformatted frames with valid CRC codes are forwarded to destination devices. In the event that a switch receives a corrupt frame from a source device, a corresponding corrupt reformatted frame is forwarded to the destination device from the switch.

34 Claims, 4 Drawing Sheets

OTHER PUBLICATIONS

"Virtual LAN Communications" at http://cio.cisco.com/warp/public/614/13.html, Cisco Systems Inc., Jan. 28, 1998.

"VLAN Interoperability" at http//cto.cisco.com/warp/public/537/6.html, Cisco Systems Inc, 1996.

"Virtual Lan Communications", at http://cio.cisco.com/warp/public/614/13/html, Cisco Systems Inc., 1996.

"3COM Transcend VLANs: Leveraging Virtual LAN Technology to Make Networking Easier", 3Com Strategic Directions, 3Com Corp., 1996.

"The Virtual LAN Technology Report" at http://www.3com.com/nsc/200374.html, 3COM Corp, Jan. 28, 1998.

"Fast IP: Enhanced Performance and Control in Switched Networks", 3Com Technical Papers, 3Com Corp., 1997.

"Virtual Local Area Nwtworks" at http://www.cis.ohio.state.edu/~jain/cis788–97/virtual_lans/index.htm, Cisco Systems Inc., modified Aug. 14, 1997.

Network 21 Cutover Workgroup: VLAN Information and Implementation (Draft ver 1.03, at http://net21policy.ucdavis.edu/newvlan.html;, Jan. 28, 1998.

* cited by examiner

METHOD AND APPARATUS PROVIDING NETWORK COMMUNICATIONS BETWEEN DEVICES USING FRAMES WITH MULTIPLE FORMATS

BACKGROUND OF THE INVENTION

1. Field of the Invention

The present invention relates generally to data communications networks and, more specifically, the present invention relates to virtual local area networks.

2. Background Information

A Local Area Network (LAN) has generally been defined as a network of computers or workstations located within a single broadcast domain. Computers that are connected to the LAN can become connected for the interchange of data. Once a message transmitted to the LAN, the message is broadcast to and received by every other user connected to the LAN.

Virtual LANs (VLANs) are used to segment networks into logically defined virtual workgroups. By logically separating the segments, messages are generally broadcast only to the workstations in the logical segment. As a result, the overall traffic is reduced since traffic remains within the segment. In addition, an added level of security is realized with VLANs since workstation users no longer receive broadcasts addressed to other segments.

There are varieties of known methods to identify and route data between workstations in a VLAN. One method is explicit tagging, which involves a VLAN tag being added to an ordinary data packet or frame. The VLAN tag indicates, among other things, the VLAN to which the data frame belongs. Another method of identifying and routing data between workstations in a VLAN is implicit tagging. Implicit tagging methods include associating a particular set of ports to a particular VLAN or associating particular communications protocol to a particular VLAN.

In some instances, some of the workstations that are connected to the VLAN may be "VLAN aware." These workstations recognize the VLAN tags that are added to the ordinary data frames. In other instances, the workstations that are connected to the VLAN are "non-VLAN aware." These workstations do not recognize the VLAN tags that are added to the data frames.

What is desired is a method and an apparatus providing data communications in networks such as VLANs. Such a method and apparatus should have the ability to transfer tagged and untagged data frames among VLAN aware and non-VLAN unaware workstations. Such a method and apparatus should convert the data frames as appropriate to enable compatibility with both the VLAN aware and non-VLAN unaware workstations. In addition, error correction codes in the frames should be maintained accordingly.

SUMMARY OF THE INVENTION

A method of communicating between a first device and a second device in a data communications network is disclosed. In one embodiment, a frame is received with a first error detection code from the first device at an inbound port of the network, the first error detection code corresponding to the frame as sent to the inbound port. The frame is converted to a first format if the frame was not sent to the inbound port in the first format. The frame is then forwarded in the first format with the first error detection code from the inbound port to an outbound port of the network. The frame is then converted to a second format if the second device recognizes the second format. Afterwards, the frame is sent from the outbound port to the second device. A second error detection code is generated corresponding to the frame as sent from the outbound port to the second device. The frame as sent to the inbound port and forwarded through the network is verified against the first error detection code. If an error is detected in the verification step, then the second error detection code is corrupted. The second error detection code is then forwarded from the outbound port to the second device. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus for transferring tagged and untagged frames between devices in a virtual local area network is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Figure 1:
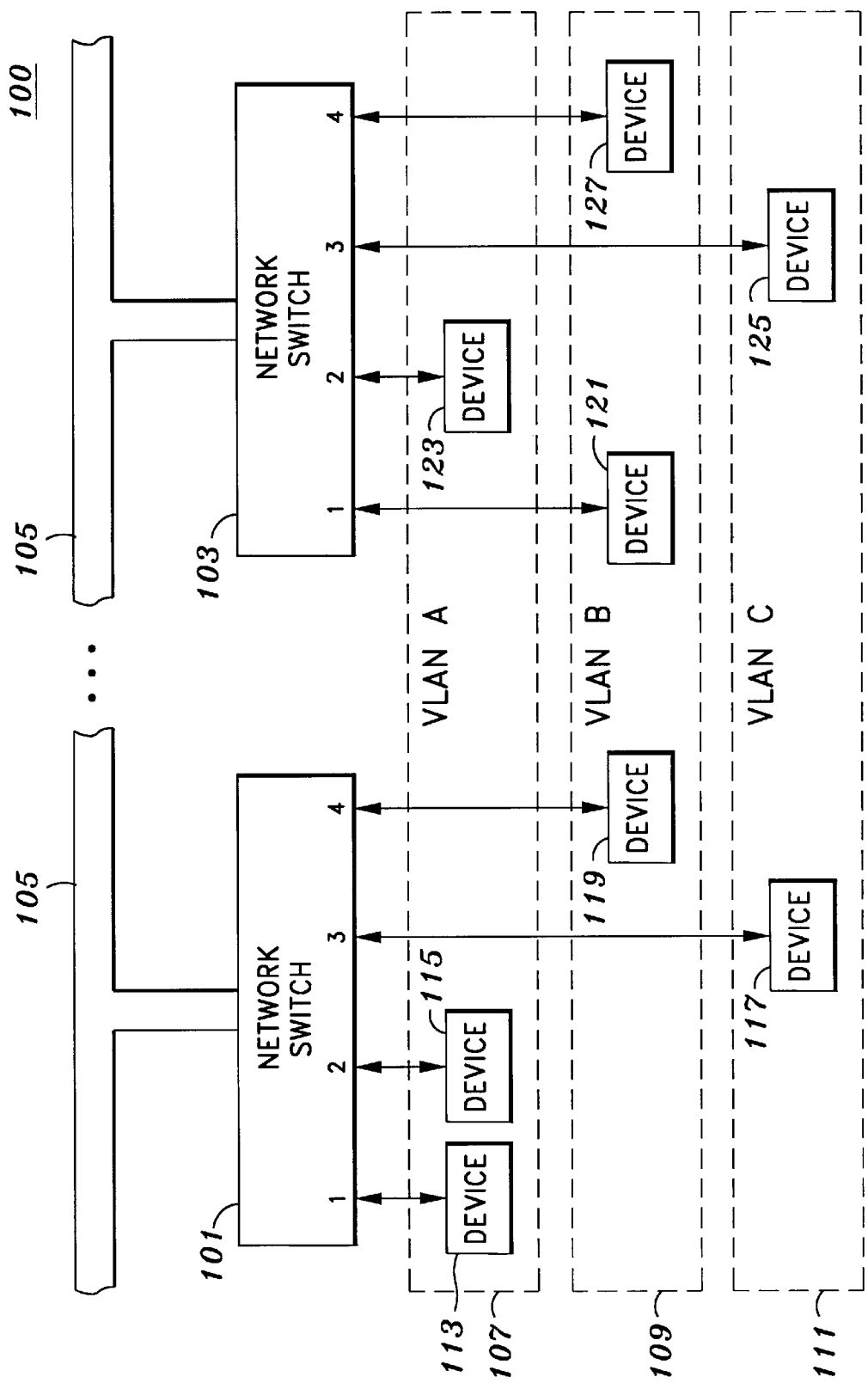
FIG. 1 is a block diagram illustrating one embodiment of a virtual local area network interconnecting a plurality of workstations through switches in accordance with the teachings of the present invention.

FIG. 1 is a block diagram illustrating one embodiment of a network 100 in accordance with the teachings of the present invention. In one embodiment, network 100 includes a box 101 coupled to a box 103 through an interface 105. In one embodiment, boxes 101 and 103 are network switches used to interconnect a plurality of network devices such as for example but not limited to workstations, servers, hubs or the like. In one embodiment, interface 105 is a high-speed connection such as for example a high-speed network backbone, packet bus, shared packet memory, trunk or the like.

As illustrated in FIG. 1, boxes 101 and 103 each include a plurality of ports, each of which may be coupled to a corresponding device. In the illustrated embodiment, devices 113, 115, 117 and 119 are coupled to ports 1, 2, 3 and 4, respectively, of box 101. Similarly, devices 121, 123, 125 and 127 are coupled to ports 1, 2, 3 and 4, respectively, of box 103. In one embodiment, each of the ports in boxes 101 and 103 may be configured as both inbound and outbound ports enabling full-duplex communications. It is appreciated that in other embodiments, boxes 101 and 103 may have a greater or less number of ports in accordance with the teachings of the present invention. In one embodiment, boxes 101 and 103 implement Ethernet switching to provide high-speed data communications between devices. It is appreciated that in other embodiments, other communications protocols may be utilized in accordance with the teachings of the present invention.

In one embodiment, a virtual local area network (VLAN) architecture is included in network 100. As can be appreciated to those skilled in the art, the implementations of VLANs greatly reduce obstacles to departmental networking that result from physical boundaries between resources. For example, departmental resources spread among several buildings may be consolidated into a single VLAN making independent physical subnets unnecessary. In the embodiment illustrated in FIG. 1, devices 113, 115 and 123 are members of VLAN A 107. Devices 119, 121 and 127 are members of VLAN B 109. Devices 117 and 125 are members of VLAN C 111.

In one embodiment, boxes 101 and 103 identify and route data frames transferred among the devices of each particular VLAN according to VLAN tags that are included within each data frame. In some instances, the tags are generated and interpreted by boxes 101 and 103, such that the implementation of the VLAN architecture is transparent to the non-VLAN aware devices. This aspect of the present invention is useful to non-VLAN aware devices that may not have the ability to generate and interpret the VLAN tags that are added to data frames. It is noted that non-VLAN aware devices may include workstations or the like that were developed before VLAN standards were adopted.

In the instances where boxes 101 and 103 are coupled to non-VLAN aware devices, boxes 101 and 103 send and receive untagged frames to and from the non-VLAN aware devices. In one embodiment, boxes 101 and 103 maintain the VLAN tags internally by assigning a default port VLAN identifier. By using boxes 101 and 103 to maintain the VLAN tags, the non-VLAN aware devices to function as if they were connected to ordinary LANs, even though a VLAN architecture is implemented.

In other instances, the devices coupled to boxes 101 and 103 may also include VLAN-aware devices that are able to generate and interpret the VLAN tags that are added to data frames. Such VLAN aware devices may include workstations or the like that were developed after VLAN standards were adopted. In these particular instances, boxes 101 and 103 send and receive tagged frames to and from the VLAN aware devices.

Figure 2A:
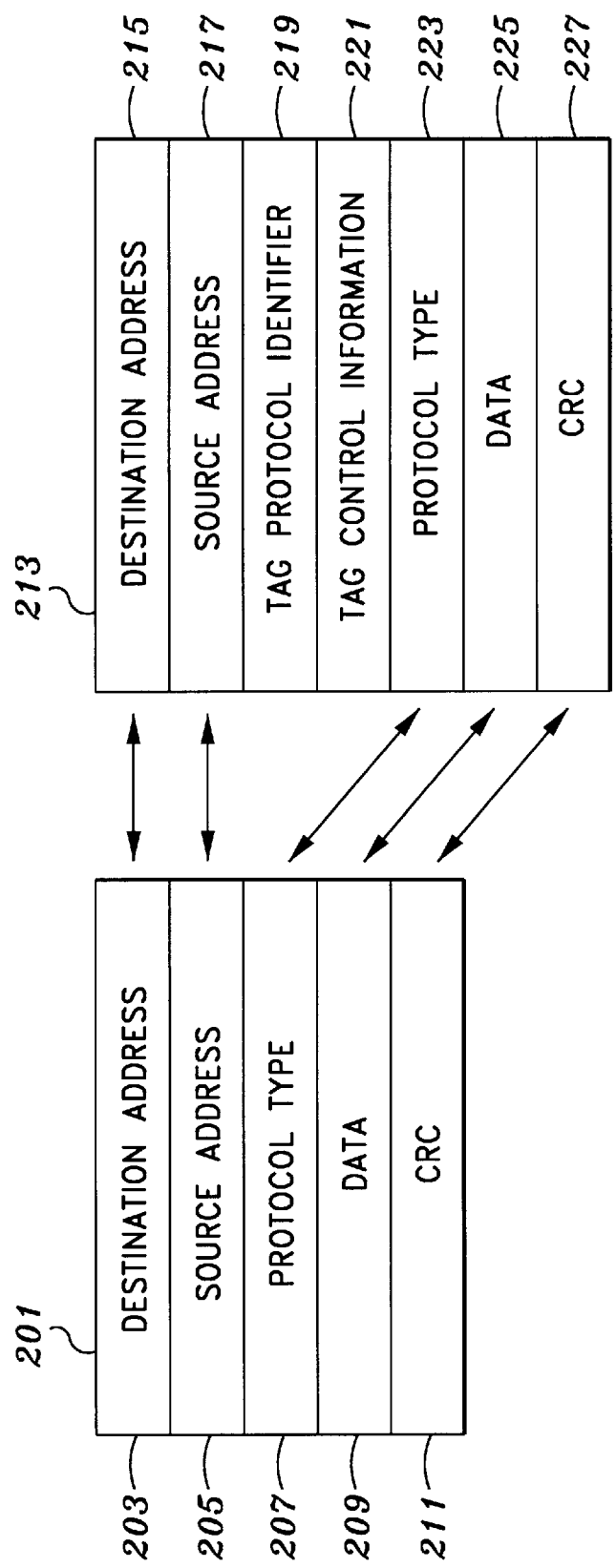
FIG. 2A is a diagram comparing one embodiment of an untagged frame and a VLAN tagged frame in accordance with the teachings of the present invention.

Recently, the Institute of Electrical and Electronics Engineers (IEEE) has promulgated a standard (IEEE 802.1Q) for tagging data frames for VLAN applications. FIG. 2A illustrates a standard Ethernet encapsulation in comparison with an IEEE 802.1Q encapsulation of a data frame. In particular, frame 201 is an Ethernet encapsulation and frame 213 is an IEEE 802.1Q encapsulation.

For purposes of discussion, it may be assumed in this disclosure that an untagged frame may correspond to an Ethernet encapsulation and that a tagged frame may correspond to an IEEE 802.1Q encapsulation. However, it is noted that other encapsulations may be utilized in accordance with the teachings of the present invention.

As shown in FIG. 2A, frame 201 in one embodiment includes a destination address field 203, a source address field 205, a protocol type field 207, a data field 209 and a cyclical redundancy check (CRC) field 211. In one embodiment, destination address field 203 includes 6 octets, source address field 205 includes 6 octets, protocol type field 207 includes 2 octets, data field 209 includes 46 to 1496 octets and CRC field 211 includes 4 octets.

In one embodiment, frame 213 includes a destination address field 215, a source address field 217, a tag protocol identifier field 219, a tag control information field 221, a protocol type field 223, a data field 225 and a CRC field 227. In one embodiment, destination address field 215 includes 6 octets, source address field 217 includes 6 octets, tag protocol identifier field 219 includes 2 octets, tag control information field 221 includes 2 octets, protocol type field 223 includes 2 octets, data field 225 includes 46 to 1496 octets and CRC field 227 includes 4 octets.

In an embodiment according to the encapsulations illustrated in FIG. 2A, a VLAN tag corresponds to tag protocol identifier field 219 and tag control information field 221, which are added to an Ethernet frame 201. Note that in the embodiment described, tagged frame 213 is bigger than untagged frame 201 since tagged frame 213 contains the VLAN tag information as well as the standard Ethernet information included in frame 201. It is appreciated that other encapsulations may be utilized for tagging data frames in accordance with the teachings of the present invention.

For purposes of this disclosure, assume that Table 1 below summarizes the relationship between the various VLANs and devices illustrated in FIG. 1.

TABLE 1

Relationship of Devices and VLANs in Figure 1

| Device | VLAN Member | Type | Send/Receive Frames |
|---|---|---|---|
| 113 | A | VLAN Aware | Tagged |
| 115 | A | Non-VLAN Aware | Untagged |
| 117 | C | VLAN Aware | Tagged |
| 119 | B | VLAN Aware | Tagged |
| 121 | B | VLAN Aware | Tagged |
| 123 | A | VLAN Aware | Tagged |
| 125 | C | VLAN Aware | Tagged |
| 127 | B | Non-VLAN Aware | Untagged |

As summarized above, VLAN A 107 includes devices 113, 115 and 123, VLAN B 109 includes devices 119, 121 and 127 and VLAN C 111 includes devices 117 and 125. In the embodiment described, devices 113, 117, 119, 121, 123 and 125 are VLAN aware devices, so they send and receive frames that are tagged. Devices 115 and 127, however, are non-VLAN aware devices in the described embodiment, so they send and receive untagged frames. Accordingly, in one embodiment, boxes 101 and 103 transfer tagged frames to and from VLAN aware devices and transfer untagged frames to and from non-VLAN aware devices.

Operation of network 100 of FIG. 1 may be summarized as follows. With respect to VLAN A 107, when device 113 sends information to device 123, port 1 of box 101 receives a tagged frame. For purposes of discussion, port 1 of box 101 may be considered an inbound port in this example. Box 101 then sends the frame over interface 105 to box 103. Box 103 then forwards the tagged frame to device 123 at port 2. For purposes of discussion, port 2 of box 103 may be considered an outbound port in this example. When device 113 sends information to device 115, an untagged frame is forwarded to device 115 instead of a tagged frame because device 115 is non-VLAN aware. Communications among the VLAN aware and non-VLAN aware devices of VLAN B 109 and VLAN C 111 are similar to those described with respect to VLAN A 107.

In sum, depending on whether the source and destination devices are VLAN aware or non-VLAN aware, boxes 101 and 103 of the VLAN architecture described above have the ability to accommodate the all of following cases: (1) receiving a tagged frame and sending a tagged frame; (2) receiving an untagged frame and sending an untagged frame; (3) receiving an untagged frame and sending a tagged frame; and (4) receiving a tagged frame and sending an untagged frame. It is noted that in one embodiment, a source device may send a frame that may be received by more than one destination device and that the destination devices do not necessarily all have to be the same type. That is, the destination devices may be a combination of VLAN aware and non-VLAN aware devices.

In one embodiment, boxes 101 and 103 convert the incoming frames received from the source devices to a common internal format such that frames containing the same data payload are transferred over interface 105 the same size, independent of whether the incoming frames are received tagged or untagged. In one embodiment, tagged frames are converted to a size equal to the size of a corresonding untagged frame. Therefore, all of the frames transferred between boxes 101 and 103 that carry the same number of data bytes in fields 209 or 225 are the same size.

Figure 2B:
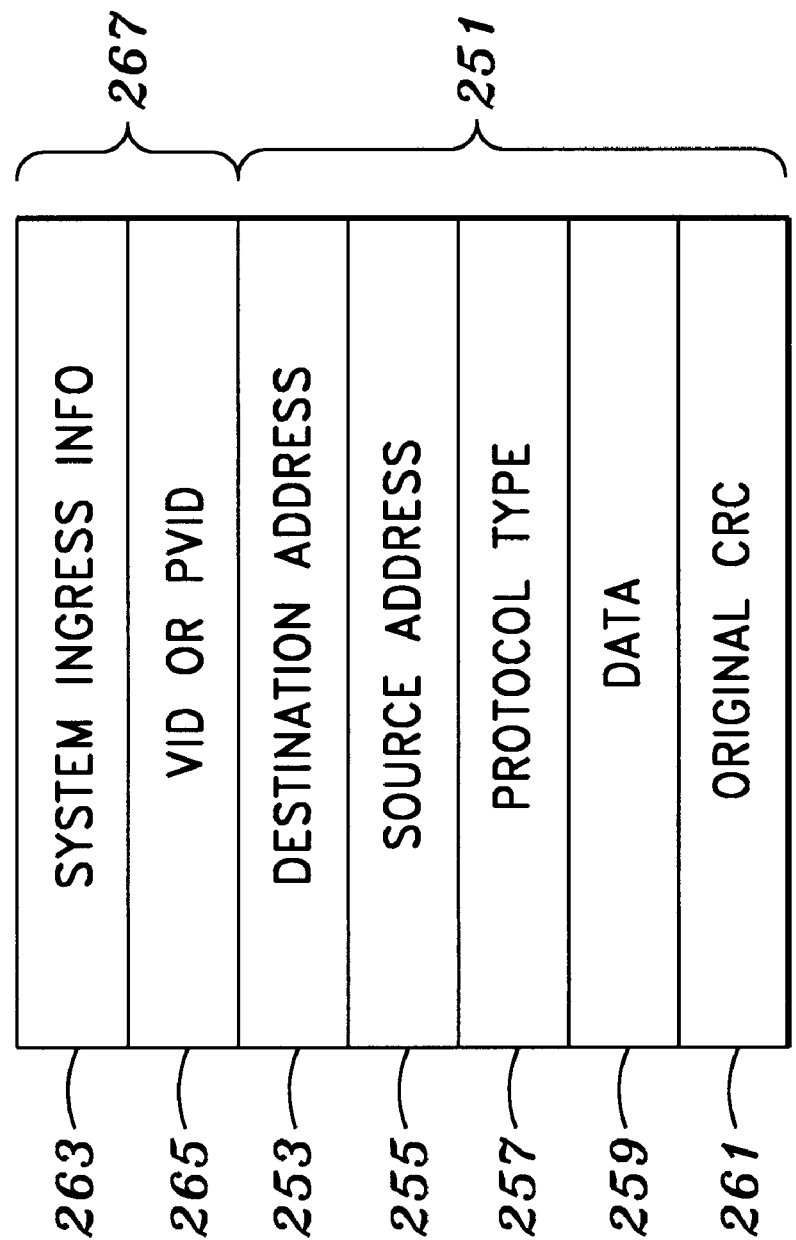
FIG. 2B is a diagram of one embodiment of an internal formatted frame and an internal system header in accordance with the teachings of the present invention.

FIG. 2B is an illustration of one embodiment of the internal formatted frame 251 and an internal system header 267 in accordance with the teachings of the present invention. In one embodiment, all internal frames and system headers are transferred within and between boxes 101 and 103 in the format illustrated in FIG. 2B. As shown in FIG. 2B, internal frame 251 corresponds to the Ethernet encapsulation frame 201 as it includes a destination address field 253, a source address field 255, a protocol type field 257, a data field 259 and an original CRC field 261. Original CRC field 261 contains the original CRC information that was contained in either CRC field 211 or CRC field 227 when the respective frame, either tagged or untagged, was received at the inbound port from the source device.

In one embodiment, system header 267 includes system ingress info field 263 and VLAN identifier (VID) or port VLAN identifier (PVID) field 265. In one embodiment, VID or PVID field 265 contains information that corresponds to the VID information that was received with incoming frame if the incoming frame arrived in a tagged format. In one embodiment, if the incoming frame is received in an untagged format, then VID or PVID field 265 is assigned default PVID information that corresponds to the ingress port at which the untagged frame was received. Thus, in one embodiment, all of the frames transferred between boxes 101 and 103 are converted to be the same size with internal formatted frame 251 and internal system header 267.

In an embodiment of the present invention that utilizes standard Ethernet encapsulations for untagged frames and IEEE 802.1Q encapsulations for tagged frames, tag protocol identifier field 219 and tag control information field 221 are removed from the incoming tagged frame when converting to the internal format of frame 251. However, the removed VLAN information is preserved in system header 267 as VID information in the VID or PVID field 265. As will be discussed in greater detail below, this will allow the incoming tagged frame to be reconstructed later as received.

In one embodiment, if the frame arrives in the inbound port in an untagged format, then the frame is not reformatted. However, the untagged frame is assigned a default port VLAN identifier, which is included in the system header 267 as PVID information in the VID or PVID field 265. Thus, tag information (VID or PVID) is associated with all frames internally in system header 267. Therefore, all of the frames transferred among the ports are the same smaller size of the internal frame 251 with VLAN information in system header 267, independent of whether the frame was received from a VLAN aware device or a non-VLAN aware device.

When the frame ultimately reaches the outbound port, the frame is converted from the internal format of frame 251 to a format depending on whether a VLAN aware device or a non-VLAN device is connected to the outbound port. If a VLAN aware device is connected to the outbound port, then appropriate tag information is added to the frame. If a non-VLAN aware device is connected to the outbound port, then the frame is forwarded to the device in an untagged format.

Referring briefly back to FIG. 2A, it is appreciated that both the Ethernet encapsulation, shown in frame 201, and the IEEE 802.1Q encapsulation, shown in frame 213, include corresponding CRC fields 209 and 227, respectively. As is known to those skilled in the art, the CRC fields 209 and 227 are error detection codes that enable the detection of errors in their respective frames. For example, if frame 201 becomes corrupted during transmission through the network, CRC field 211 will be inconsistent with the information contained in frame 201 and an error may be detected using known techniques. Similarly, if frame 213 becomes corrupted during transmission through the network, CRC field 227 will be inconsistent with the information contained in frame 213 and an error may be detected using known techniques.

It is noted that in one embodiment, the error detection information contained in the CRC field of the frame as received at the inbound port will not correspond to its associated frame if the frame is reformatted when forwarded out the outbound port. In particular, this situation arises when an untagged frame is received at the inbound port but is forwarded as a tagged frame at the outbound port. This situation also arises when a tagged frame is received at the inbound port but is forwarded as an untagged frame at the outbound port.

Therefore, in one embodiment, a new corresponding error detection code is generated at the outbound port for each frame that is forwarded in a different format. Thus, in most instances, each destination device receives valid CRC information in accordance with the teachings of the present invention. If a VLAN aware device is coupled to the outbound port, a new CRC field 227 is generated at the outbound port corresponding to frame 213 if the frame originated from a non-VLAN aware device. If a non-VLAN aware device is coupled to the outbound port, a new CRC field 211 is generated at the outbound port corresponding to frame 201 if the frame originated from a VLAN aware device.

It is noted that there is a possibility that a frame may be corrupted while being forwarded through the system. However, since one embodiment of the present invention regenerates a new CRC code when forwarding the frames from the outbound port, the error in the corrupt frame would be undetectable if the frame is forwarded with the newly generated CRC code.

To address this potential problem, an adequate amount of information is preserved in system header 267 to enable frames to be reconstructed as originally received at the inbound ports, assuming the original frame is not already available in the outbound box. In particular, reconstruction is accomplished by including information in internal system headers 267 to allow the VLAN tag information that was removed from tagged inbound frames to be reconstructed at the outbound port. In one embodiment, the system headers 267 are forwarded to the outbound ports from the inbound ports along with the internal data frames 251. When the internal data frames 251 reach the outbound ports, the original frames are reconstructed using the information included in the system headers 267 to recreate the frames as they were originally received at the inbound ports.

After the originally received frame is obtained, it is verified against original CRC code received at the inbound port and transferred through the system to verify data integrity. In one embodiment, if discrepancy is detected between the originally received data frame and the original CRC code received at the inbound port, then an error has been detected.

In one embodiment of the present invention, the step of verifying the originally received frame is executed in parallel with the step of generating a new error detection code for the forwarded frame to maintain performance. In addition, the verification step is completed before the new error detection code is completely forwarded through the outbound port to the destination device. Thus, in one embodiment, if a discrepancy is detected during the verification, the new error detection code that is generated for the frame being forwarded to the destination device is intentionally corrupted. The corrupted error detection code will therefore be inconsistent with the frame being transferred to the destination device. If the verification step is successful, however, the new error detection code is not corrupted and is therefore properly forwarded to the destination device through the outbound port.

To summarize, if a corrupt frame is corrupted within the system, a correspondingly corrupt frame is transferred from the outbound port. If a valid frame is received at the inbound port and is not corrupted while being transferred within the system, a valid frame is transferred from the outbound port.

Figure 3:
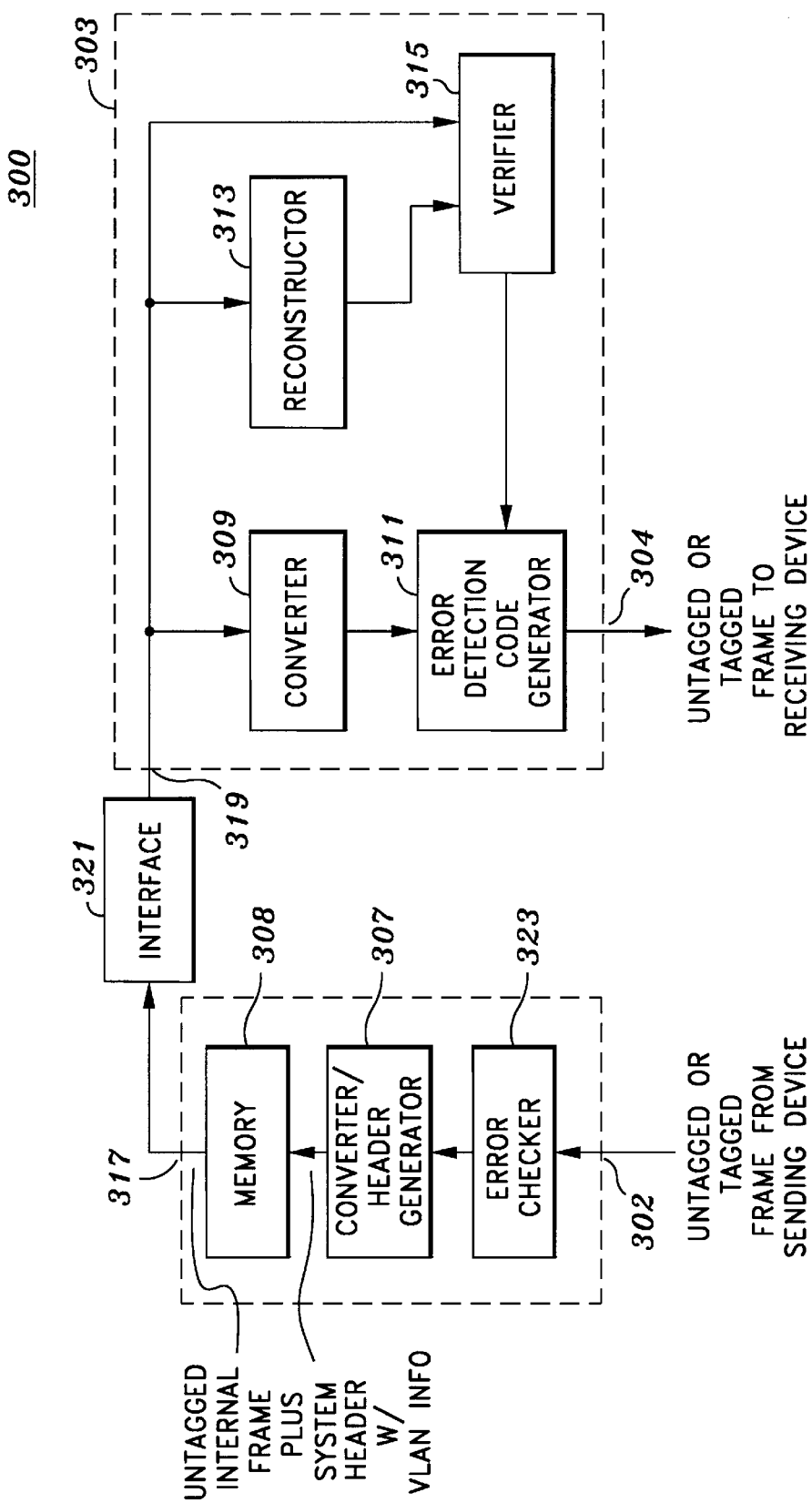
FIG. 3 is a diagram illustrating one embodiment of internal elements of interconnected switches of a VLAN and in accordance with the teachings of the present invention.

FIG. 3 is a block diagram of one embodiment of network 300 in accordance with the teachings of the present invention. A box 301 is coupled to box 303 via an interface 305. In one embodiment, interface 305 is a high-speed connection such as for example a high-speed network backbone, packet bus, shared packet memory, trunk or the like. In one embodiment, box 301 includes an inbound port 302 coupled to receive a frame from a sending device. Box 303 includes an outbound port 304 coupled to forward a frame to a receiving device.

In another embodiment, boxes 301 and 303 each include a plurality of both inbound and outbound ports in accordance with the teachings of the present invention. In such an embodiment, the elements contained in box 301 are symmetric with the elements included in box 303 and vice versa. Thus, the elements in box 301 are also included in box 303 and the elements included within box 303 are also included within box 301. In addition, frames may be transferred to or from boxes 301 and 303 through interface 305.

In the example described below, a frame received at inbound port 302 is assumed to be addressed for the device coupled to outbound port 304 and is thus forwarded by box 301 to box 303 via interface 305. In one embodiment, an internal system header corresponding to the forwarded frame is also forwarded from box 301 to box 303 via interface 305.

As shown in FIG. 3, box 301 includes an error checker 323 coupled to a converter/header generator 307 coupled to a memory 308. Error checker 323 is coupled to receive a frame from inbound port 302. In one embodiment, the frame received through inbound port 302 may be untagged or tagged as illustrated in frames 201 or 213, respectively, of FIG. 2. If an untagged frame is received, error checker 323 checks for errors in the received frame using CRC field 211. If a tagged frame is received, error checker 323 checks for errors in the received frame using CRC field 227. If no errors are detected, the frame is forwarded to converter/header generator 307.

In one embodiment, converter/header generator 307 is used to convert frames from a tagged format to an untagged format. For instance, in one embodiment, converter/header generator 307 converts received tagged frames to the untagged internally formatted frames, illustrated in frame 251 of FIG. 2B. Converter/header generator 307 also generates the corresponding internal system header 267. In one embodiment, the VLAN information stripped from the tagged frame is preserved as VID information in the internal system header 267.

In one embodiment, if frames are received in an untagged format from inbound bound port 302, converter/header generator 307 simply forwards the frame in the untagged format. For instance, if Ethernet encapsulated frames, which are illustrated in FIG. 2A as frame 201 are received, converter/header generator 307 generates the corresponding untagged internally formatted frames, illustrated as frame 251 in FIG. 2B. However, converter/header generator 307 also generates the corresponding internal system header, which is illustrated in FIG. 2B as system header 267. In one embodiment, the VLAN information stored in the system header 267 generated for an untagged frame includes the PVID information that corresponds to inbound port 302.

Whether a tagged frame or an untagged frame is received at inbound port 302, the original CRC information of the inbound frames is not changed and is forwarded as received from inbound port 302. It is worthwhile to note that because the original CRC information is forwarded, the CRC information may or may not be consistent with the forwarded frame. This is because there are some instances when a tagged frame may be received at input port with valid CRC information, but the frame is converted to the untagged internal format of frame 251 without updating the CRC information. In addition, it is noted that when inbound frames are converted from the tagged to the untagged internal format, sufficient VID information is stored in the system header to enable the frames to be later reconstructed as received.

In one embodiment, after converter/header generator 307 generates the internal formatted frames 251 and generates the internal system headers 267, the information is buffered in memory 308 before being forwarded to box 303 via interface 305 though input/output port 317. As discussed above, all of the received incoming frames are converted to the common internal format illustrated frame 251 such that all frames containing the same data payload are transferred over interface 305 the same size. Therefore, in one embodiment, the burst transfers of information into and out of memory 308 involve same sized data frames. Since same sized data frames are transferred into and out of memory 308 over interface 305, memory bandwidth efficiency is improved and the possibility of data under-run errors is reduced. As can be appreciated to those skilled in the art, if variable sized data frames were transferred through the system, the possibility of data under-run errors would be increased.

As shown in FIG. 3, the untagged internal frame plus the internal system header containing VLAN information is forwarded from converter/header generator 307 to memory 308, and from memory 308 to box 303 through interface 305. As mentioned earlier, the internal system header transferred from box 301 to box 303 contains the VLAN information that enables reconstruction of the tagged frame as received at port 302 in box 303. If an untagged frame is received from inbound port 302, reconstruction will not be necessary in one embodiment since the original frame will be included in the internally formatted frame that is transferred from box 301 to box 303.

Box 303 includes a converter 309, a reconstructor 313 and a verifier 315 coupled to receive the forwarded frame and system header from interface 305 through an input/output port 319. An error detection code generator 311 is coupled between an output of converter/header generator 307 and outbound port 304. An output of reconstructor 311 is coupled to an input of verifier 315. An output of verifier 315 is coupled to an input error detection code generator 311.

In one embodiment, if a VLAN aware device is coupled to outbound port 304, then a tagged frame is forwarded out of outbound port 304. Thus, converter 309 converts the untagged internal frame received over interface 305 to a tagged frame. Error detection code generator 311 then receives the converted frame and a new error detection code is generated corresponding to the converted frame. The new error detection code is then inserted into the CRC field 227 of the tagged packet. The tagged packet is then forwarded to the receiving device through outbound port 304.

In one embodiment, if a non-VLAN aware device is coupled to outbound port 304, then an untagged frame is forwarded out of outbound port 304. Thus, converter 309 converts the untagged internal frame received over interface 305 to an untagged format suitable to be received by the receiving device coupled to outbound port 304. In one embodiment, converter 309 simply passes the untagged internal frame received over interface 305 to error detection code generator 311.

In one embodiment, error detection code generator 311 receives the frame from converter 309 and a new error detection code is generated corresponding to the converted frame. The new error detection code is then inserted into the CRC field 211 of the untagged packet. There may be some instances when existing error detection code in CRC field 211 already corresponds to the frame output by converter 309 such that error detection code generator 311 does not need to regenerate a valid error detection code. In this instance, error detection code generator 311 simply passes the existing error detection code in CRC field 211. The tagged frame is then forwarded to the receiving device through outbound port 304.

In one embodiment, reconstructor 313 receives the untagged internal frame and system header from interface 305. Reconstructor 313 reconstructs the frame as originally received at inbound port 302 based on the untagged frame and system header received from interface 305. As mentioned, there are some instances when the untagged internal frame received over interface 305 may already be the frame as originally received through inbound port 302. In this instance, reconstructor 313 simply passes the frame unchanged in one embodiment.

Verifier 315 then receives the frame output by reconstructor 313 and verifies the frame against the error detection code information included in the untagged internal frame received from interface 305. As mentioned earlier, the error detection code information included in the original CRC field 261 of the untagged internal frame received from interface 305 is the original error detection code received at inbound port 302.

If verifier 315 detects an inconsistency between the original error detection code and the reconstructed frame, then a corrupt frame was received at inbound port 302 or the frame was corrupted while being transferred within the system. As a result, the new error detection code generated by error detection code generator 311 is corrupted such that the device coupled to outbound port 304 also receives a corrupt frame. If verifier 315 does not detect an inconsistency between the original error detection code and the reconstructed frame, then a valid new error detection code generated by error detection code generator 311 and is transmitted to outbound port 304.

Thus, a data communications network has been described. Although the present invention has been described in the context of a VLAN, it is appreciated that the present invention also has other networking applications that modify the encapsulations of frames transferred among network devices. In such applications, the error detection codes included in the frames may not be consistent with the corresponding frames. The presently described invention modifies frame formats transferred among network devices and maintains the error detection codes such that the data is properly transferred throughout the network.

In the foregoing detailed description, the method and apparatus of the present invention has been described with reference to specific exemplary embodiments thereof. However, it will be evident that various modifications and changes may be made thereto without departing from the broader spirit and scope of the present invention. The present specification and figures are accordingly to be regarded as illustrative rather than restrictive.

What is claimed is:

1. In a data communications network, a method of communicating between a first device and a second device, the method comprising the steps of:

receiving a frame with a first error detection code from the first device at an inbound port of the network, the first error detection code corresponding to the frame as sent to the inbound port;

converting the frame to a first format if the frame was not sent to the inbound port in the first format;

forwarding the frame in the first format and the first error detection code from the inbound port to an outbound port of the network;

converting the frame to a second format if the second device recognizes the second format;

sending the frame from the outbound port to the second device;

generating a second error detection code corresponding to the frame as sent from the outbound port to the second device;

verifying the frame as sent to the inbound port and forwarded through the network against the first error detection code;

corrupting the second error detection code if an error is detected in the verification step; and sending the second error detection code from the outbound port to the second device.

2. The method described in claim 1 wherein the step of converting the frame to the first format includes the step of reducing a size of the frame while containing the same data payload in the frame.

3. The method described in claim 2 wherein the step of converting the frame to the first format if the frame was not sent to the inbound port in the first format includes the additional step of preserving information to reconstruct the frame as sent to the inbound port.

4. The method described in claim 3 wherein the step of verifying the frame as sent to the inbound port against the first error detection code includes the step of reconstructing the frame as sent to the inbound port, wherein the step of reconstructing the frame as sent to the inbound port is performed after the step of forwarding the frame in the first format and the first error detection code from the inbound port to the outbound port.

5. The method described in claim 1 wherein the step of forwarding the frame in the first format and the first error detection code from the inbound port to the outbound port of the network includes the step of forwarding the frame through a packet bus of a virtual local area network.

6. The method described in claim 1 wherein the step of converting the frame to the first format if the frame was not sent to the inbound port in the first format includes the step of removing virtual local area network tag information from the frame.

7. The method described in claim 1 including the additional steps of:
   storing virtual local area network tag information in a system header; and
   forwarding the system header with the frame from the inbound port to the outbound port of the network.

8. The method described in claim 7 wherein the step of converting the frame to the second format if the second device recognizes the second format includes the additional step of adding virtual local area network tag information to the frame.

9. The method described in claim 1 wherein the step of generating the second error detection code corresponding to the frame as sent from the outbound port to the second device and the step of verifying the frame as sent to the inbound port against the first error detection code are performed concurrently.

10. The method described in claim 1 wherein the step of corrupting the second error detection code if an error is detected in the verification step is performed before the step of sending the second error detection code from the outbound port to the second device is completed.

11. An apparatus, comprising:
   an input/output port coupled to receive a first frame converted to a first format, the first frame including a first error detection code;
   a converter coupled between the input/output port and an outbound port, the converter converting the first frame in the first format to a second format if the outbound port is to communicate with a device which recognizes the second format;
   a reconstructor coupled to the input/output port to receive the first frame in the first format, the reconstructor reconstructing an original frame from the first frame;
   a verifier coupled to the reconstructor and the input/output port, the verifier verifying the original frame with respect to the first error detection code; and
   an error detection code generator coupled to the verifier and coupled between the outbound port and the converter to generate a second error detection code corresponding to second frame, the error detection code generator corrupting the second error detection in response to the verifier.

12. The apparatus described in claim 11 wherein the input/output port is coupled to an interface of a virtual local area network.

13. The apparatus described in claim 12 wherein the interface includes a packet bus of the virtual local area network.

14. The apparatus described in claim 12 wherein wherein the interface includes a shared packet memory of the virtual local area network.

15. The apparatus described in claim 12 wherein a second apparatus coupled to the interface generates the first frame including the first error detection code, the second apparatus including a converter/header generator coupled between an inbound port and the interface.

16. The apparatus described in claim 15 wherein the inbound port is coupled to a virtual local area network aware device.

17. The apparatus described in claim 15 wherein the inbound port is coupled to a non-virtual local area network aware device.

18. The apparatus described in claim 11 wherein the outbound port is coupled to a virtual local area network aware device.

19. The apparatus described in claim 11 wherein the outbound port is coupled to a non-virtual local area network aware device.

20. The apparatus described in claim 15 wherein the converter/header generator removes virtual local area network tag information from the first frame.

21. The apparatus described in claim 15 wherein the converter/header generator generates a system header including virtual local area network tag information.

22. The apparatus described in claim 20 wherein the converter adds virtual local area network tag information to the first frame.

23. The apparatus described in claim 11 wherein the reconstructor reconstructs the original frame from the first frame and from information in a system header received from the input/output port.

24. A data communications network, comprising:
   a first switch having an inbound port coupled to receive a frame and a first error detection code from a first device, the first error code corresponding to the frame received at the inbound port, the first switch having a first converter to convert the frame to a first format;
   a second switch coupled to the first switch to receive the frame in the first format and the first error detection code, the second switch forwarding the frame to a second device through an outbound port, the second switch including:
      a second converter coupled to receive the frame in the first format from the first switch, the second converter converting the frame from the first format to a second format if the second device recognizes the first format or maintaining the frame in the first format if the second device recognizes the first format;
      an error detection code generator coupled to receive the frame forwarded to the second device, the error detection code generator generating a second error detection code corresponding to the frame forwarded to the second device, the second switch forwarding the second error detection code to the second device;
      a reconstructor coupled to receive the frame in the first format from the first switch, the reconstructor reconstructing the frame received at the inbound port of the first switch; and
      a verifier coupled to the reconstructor and coupled to receive the first error detection code, the verifier verifying the frame received at the inbound port of the first switch against the first error detection code, the verifier further coupled to the error detection code generator such that the error detection code generator corrupts the second error correction code forwarded to the second device if the verifier detects a discrepancy between the frame received at the inbound port of the first switch and the first error detection code.

25. The data communications network of claim 24 wherein the first switch is coupled to the second switch through a packet bus of a virtual local area network.

26. The data communications network of claim 24 wherein the first converter removes virtual local area network tag information from the frame received at the inbound port.

27. The data communications network of claim 24 wherein the second converter adds virtual local area network tag information to the frame when converting the frame from the first format to the second format.

28. The data communications network of claim 24 wherein the first switch generates a system header, wherein the second switch is coupled to receive the system header from the first switch.

29. The data communications network of claim 28 wherein the reconstructor is coupled to receive the system header, the reconstructor reconstructing the frame received at the inbound port of the first switch in response to the system header and the frame in the first format from the first switch.

30. An apparatus, comprising:
   an inbound port to receive a first frame with a first error detection code;
   a converter/header generator coupled to the inbound port to
      a.) remove virtual local area network tag information from the first frame to generate the first frame in a first format if the first frame is received with virtual local area network tag information, and
      b.) add virtual local area network tag information to the first frame to generate the first frame in a first format if the first frame is received without virtual local area network tag information; and,
   an input/output port coupled to the converter/header generator to forward the first frame in the first format with the first error detection code.

31. The apparatus described in claim 30 wherein the inbound port is coupled to a virtual local area network aware device.

32. The apparatus described in claim 30 wherein the inbound port is coupled to a non-virtual local area network aware device.

33. In a data communication network a method, comprising:
   receiving a frame with a first error detection code at an inbound port;
   determining whether the frame is received with virtual local area network tag information;
   adding virtual local area network tag information to the frame to convert the frame to a first format if the frame is received without virtual local area network tag information;
   removing virtual local area network tag information from the frame to convert the frame to a first format if the frame is received with virtual local area network tag information; and,
   forwarding the frame in the first format with the first error detection code to an input/output port.

34. The method of claim 33, wherein the forwarding the frame in the first format and the first error detection code to an input/output port includes forwarding the frame through a packet bus of a virtual local area network.

\* \* \* \* \*